United States Patent
Loh et al.

(10) Patent No.: US 9,454,419 B2
(45) Date of Patent: Sep. 27, 2016

(54) PARTITIONABLE DATA BUS

(71) Applicant: Advanced Micro Devices, Inc., Sunnyvale, CA (US)

(72) Inventors: Gabriel H. Loh, Bellevue, WA (US); Yi Xu, Beijing (CN); James M. O'Connor, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 79 days.

(21) Appl. No.: 14/016,610

(22) Filed: Sep. 3, 2013

(65) Prior Publication Data

US 2015/0026511 A1   Jan. 22, 2015

(30) Foreign Application Priority Data

Jul. 18, 2013   (WO) ................ PCT/CN2013/007952

(51) Int. Cl.
*G06F 11/00* (2006.01)
*G06F 11/07* (2006.01)
*G06F 11/20* (2006.01)

(52) U.S. Cl.
CPC ....... *G06F 11/0727* (2013.01); *G06F 11/2007* (2013.01); *G06F 2201/85* (2013.01)

(58) Field of Classification Search
CPC .................................................. G06F 11/3027
See application file for complete search history.

(56) References Cited

U.S. PATENT DOCUMENTS

| | | | |
|---|---|---|---|
| 5,317,715 A * | 5/1994 | Johnson et al. ................ 710/22 |
| 5,666,480 A * | 9/1997 | Leung et al. .................... 714/1 |
| 5,867,645 A | 2/1999 | Olarig | |
| 6,643,787 B1 * | 11/2003 | Zerbe et al. .................. 713/400 |
| 6,757,809 B1 * | 6/2004 | Yoshida .......................... 712/33 |
| 7,219,182 B2 * | 5/2007 | Byers et al. .................. 710/305 |
| 2002/0112109 A1 * | 8/2002 | Jorgenson ..................... 710/305 |
| 2005/0058086 A1 | 3/2005 | Borkenhagen et al. | |
| 2007/0011387 A1 | 1/2007 | Gaskins | |
| 2014/0380085 A1 * | 12/2014 | Rash et al. ........................ 714/3 |

OTHER PUBLICATIONS

International Search Report and Written Opinion for International Application No. PCT/CN2013/079572, State Intellectual Property Office of the P.R. China, Beijing, mailed on Apr. 23, 2014 (13 pages).

Zhao, J., et al., "Energy-efficient GPU Design with Reconfigurable In-package Graphics Memory," *ISLPED '12*, ACM, United States (2012).

* cited by examiner

*Primary Examiner* — Christopher McCarthy
(74) *Attorney, Agent, or Firm* — Volpe and Koenig, P.C.

(57) ABSTRACT

A method and a system are provided for partitioning a system data bus. The method can include partitioning off a portion of a system data bus that includes one or more faulty bits to form a partitioned data bus. Further, the method includes transferring data over the partitioned data bus to compensate for data loss due to the one or more faulty bits in the system data bus.

14 Claims, 6 Drawing Sheets

PARTITIONABLE DATA BUS

CROSS REFERENCE TO RELATED APPLICATION

This application claims the benefit of priority to International Application No. PCT/CN2013/079572, filed Jul. 18, 2013, titled "Partitionable Data Bus", which is incorporated herein by reference in its entirety.

BACKGROUND

1. Field

Embodiments generally relate to a partitionable data bus. More particularly, embodiments relate to partitioning a data bus to remove one or more faulty bits from the data bus.

2. Background

Die-stacked memory devices can be combined with one or more processing units (e.g., Central Processing Units (CPUs), Graphics Processing Units (GPUs), and Accelerated Processing Units (APUs)) in the same electronics package. A characteristic of this type of package is that it can include, for example, over 1000 data connections (e.g., pins) between the one or more processing units and the die-stacked memory device. This high number of data connections is significantly greater than data connections associated with off-chip memory devices, which typically have 32 or 64 data connections.

Another characteristic of the above electronics package is that all the data connections for a single memory channel communicate with a corresponding processing unit, in which the single memory channel can be associated with a single die-stacked memory device. For example, the single memory channel can support a 128-bit data bus, in which the 128-bit data bus can be connected to the single die-stacked memory device. If a single bit in the 128-bit data bus is faulty, then the die-stacked memory device is considered faulty or "dead" as well. In turn, the entire electronics package (e.g., one or more processing units with die-stacked memory device) is also considered faulty or "dead," thus resulting in lower manufacturing yield and higher manufacturing cost.

SUMMARY OF EMBODIMENTS

Therefore, there is a need for a partitionable memory channel or data bus that enables the use of a memory device when one or more data bits in the memory channel are faulty.

An embodiment includes a method for partitioning a system data bus. The method can include partitioning off a portion of a system data bus that includes one or more faulty bits to form a partitioned data bus. Further, the method includes transferring data over the partitioned data bus to compensate for data loss due to the one or more faulty bits in the system data bus. Data can be transferred over the partitioned data bus using additional data transfer cycles to compensate for data loss attributed to a single data transfer over the system data bus.

Another embodiment includes a system with a partitionable data bus. The system includes a first computing device, a second computing device, and a data bus that provides communication between the first and second computing devices. The second computing device can be configured to: partition off a portion of a system data bus that includes one or more faulty bits to form a partitioned data bus; and, transfer data over the partitioned data bus to compensate for data loss due to the one or more faulty bits in the system data bus. The system data bus, first computing device, and second computing device can be integrated in the same electronics package (e.g., stacked integrated circuit package). Alternatively, the first computing device can be in a first electronics package and the second computing device can be in a second electronics package, where the system data bus provides off-chip communication between the first and second computing devices.

Further features and advantages of the embodiments disclosed herein, as well as the structure and operation of the embodiments, are described in detail below with reference to the accompanying drawings. It is noted that the invention is not limited to the specific embodiments described herein. Such embodiments are presented herein for illustrative purposes only. Additional embodiments will be apparent to a person of ordinary skill in the art based on the teachings contained herein.

BRIEF DESCRIPTION OF THE DRAWINGS

The accompanying drawings, which are incorporated herein and form a part of the specification, illustrate embodiments and, together with the description, further serve to explain the principles of the invention and to enable a person of ordinary skill in the art to make and use the embodiments disclosed herein.

Figure 1:
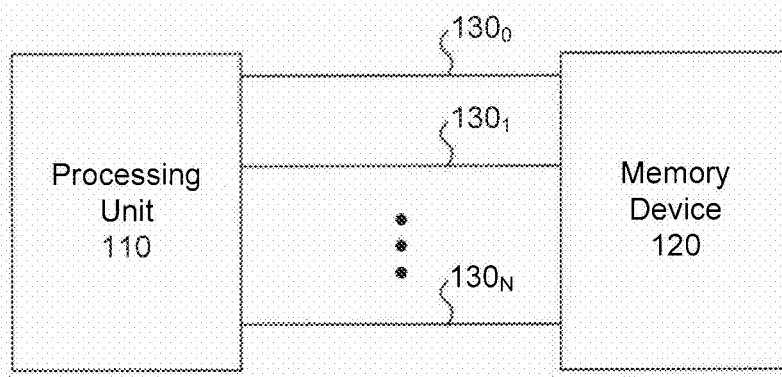
FIG. 1 is an illustration of an example computing environment in which embodiments, or portions thereof, can be implemented.

Embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the scope of the invention. Rather, the scope of the invention is defined by the appended claims.

It would be apparent to a person of ordinary skill in the art that the embodiments disclosed herein, or portions thereof, can be implemented in many different forms of software, hardware, firmware, and/or the entities illustrated in the figures. Thus, the operational behavior of the embodiments disclosed herein will be described with the understanding that modifications and variations of the embodiments are possible, given the level of detail presented herein.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of a person of ordinary skill in the art to effect such feature, structure, or characteristic in connection with other embodiments whether or not explicitly described.

FIG. 1 is an illustration of an example computing environment 100 in which embodiments, or portions thereof, can be implemented. Computing environment 100 includes a processing unit 110, a memory device 120, and data bus $130_0$-$130_N$ (also referred to herein as "memory channel 130"). Processing unit 110 can be, for example and without limitation, a Central Processing Unit (CPU), a Graphics Processing Unit (GPU), an Accelerated Processing Unit (APU), a memory controller, or a combination thereof. Memory device 120 can be, for example and without limitation, a Dynamic Random Access Memory (DRAM) device, a Static Random Access Memory (SRAM) device, a Flash memory device, a Phase Change Memory (PCM) device, a Spin-Torque-Transfer Magnetoresistive Memory (STT-MRAM) device, a Resistive Memory/Memristor (RRAM) device, or other type of memory device. Data bus $130_0$-$130_N$, or memory channel 130, facilitates communication between processing unit 110 and memory device 120, as would be understood by a person of ordinary skill in the art. The number of bits "N" in memory channel 130 can vary based on the design of computing environment 100 and can be, for example and without limitation, 4-, 8-, 16-, 32-, 64-, 128-, 256-, or 512-bits. Data bus $130_0$-$130_N$ can be either a unidirectional bus (e.g., used for either transmitting or receiving data) or a bidirectional bus (e.g., used for both transmitting and receiving data).

In an embodiment, processing unit 110 and memory device 120 can be packaged as a multi-chip module. For example, processing unit 110, memory device 120, and data bus $130_0$-$130_N$ can be disposed on a unifying substrate that facilitates the operation of computing environment 100 within a single electronics package. In another embodiment, processing unit 110 and memory device 120 can be packaged in a stacked configuration. For example, memory device 120 can be physically stacked on top of processing unit 110, in which data bus $130_0$-$130_N$ can be wire bonded between the two devices. Memory device 120 can be in communication with processing unit 110 via data bus $130_0$-$130_N$ using through-silicon vias (TSVs), micro-bumps, and other interconnect technologies. In yet another embodiment, processing unit 110 and memory device 120 can each reside in their own respective packages, in which data bus $130_0$-$130_N$ facilitates off-chip communication between the two devices. Processing unit 110 and memory device 120 can be packaged in other configurations, as would be understood by a person of ordinary skill in the art.

For explanation purposes, computing environment 100 of FIG. 1 will be used in the description below. However, based on the disclosure herein, a person of ordinary skill in the art will recognize that the embodiments disclosed herein are applicable to other computing environments (e.g., at least two processing units, or computing devices, in communication with one another over a data bus). These other computing environments are within the spirit and scope of the embodiments disclosed herein.

Figure 2:
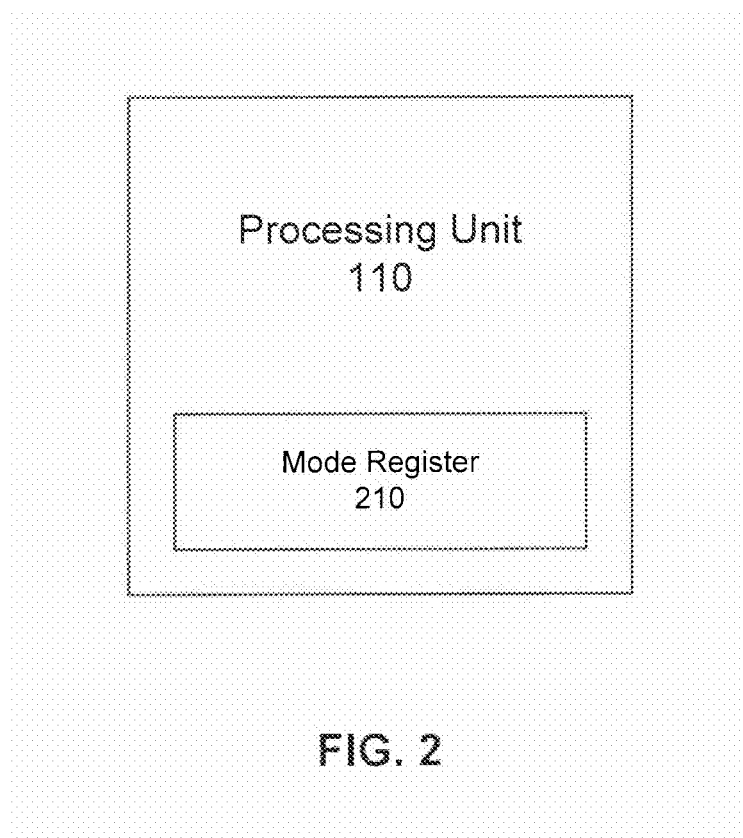
FIG. 2 is an illustration of an embodiment of a mode register that can be implemented in a processing unit.

FIG. 2 is an illustration of an embodiment of a mode register 210 that can be implemented in processing unit 110. Mode register 210 specifies whether input/output (I/O) interfaces of processing unit 110 and memory device 120 (not shown in FIG. 2) operate at full bus width, at half bus width, or at another bus width. In an embodiment, mode register 210 is a per-processing unit and a per-memory block interface (e.g., one mode register per processing unit and per memory block). For proper communication between processing unit 110 and memory device 120, mode register 210 is implemented in both processing unit 110 and memory device 120 such that both devices are configured to transfer and/or receive data over the partitioned bus width, according to an embodiment. For example, mode register 210 can set the I/O interfaces of processing unit 110 and memory device 120 to various bus width configurations, as will be described below.

Full, half, and other bus widths correspond to the number of bits in data bus $130_0$-$130_N$ that are active during operation of computing environment 100 of FIG. 1 (e.g., during a read or a write operation). In an embodiment, by default, mode register 210 can be set to full bus width, such that computing environment 100 utilizes the entire data bus $130_0$-$130_N$ during operation. In another embodiment, the full bus width may be less than the total number of circuits/lines available, thus enabling a potential for redundant circuits/lines. When a fault is detected in one or more bits of data bus $130_0$-$130_N$ (e.g., fault in receive/transmit circuits associated with a data bit or pin), mode register 210 can be set to a value, such that a portion of data bus $130_0$-$130_N$ is utilized by computing environment 100. As would be understood by a person of ordinary skill in the art, one or more faults in data bus $130_0$-$130_N$ can be detected, for example, during a device test phase of manufacturing. Alternatively, the one or more faults in data bus $130_0$-$130_N$ can be detected during normal operation computing environment 100 (e.g., during a read and/or a write operation). For example, over the course of the computing system's lifetime, one or more faults may occur and be detected in data bus $130_0$-$130_N$.

Figure 3A:
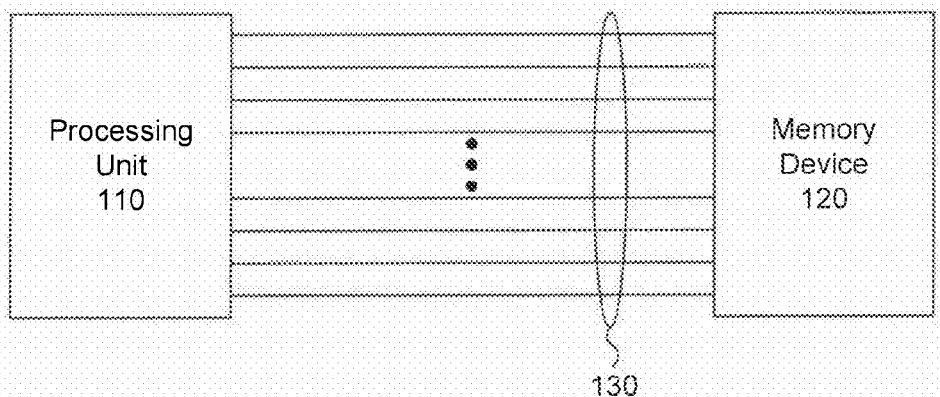
FIGS. 3(*a*)-(*c*) are illustrations of example bus widths that a mode register can set for an input/output interface of a processing unit.
Figure 3B:
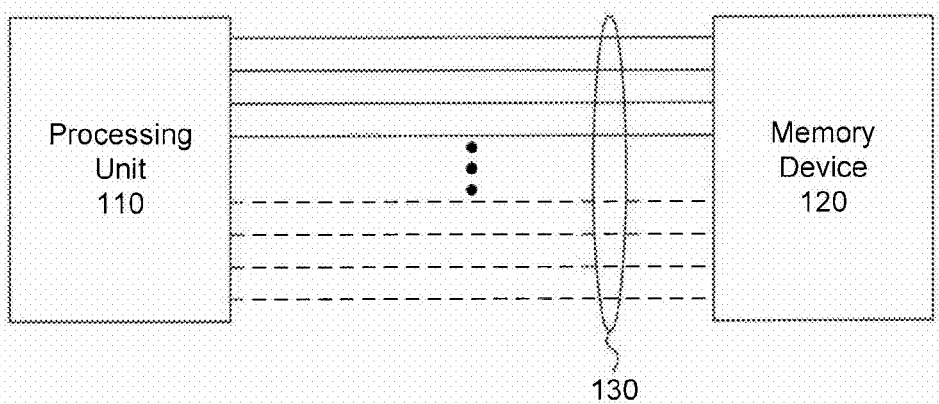
Figure 3C:
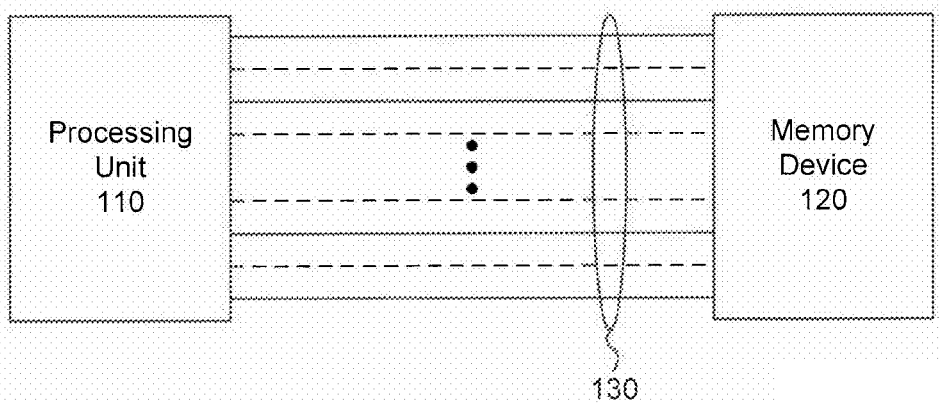

FIGS. 3(a)-(c) illustrate example bus widths that mode register 210 can set for the I/O interfaces of processing unit 110 and memory device 120. For example purposes, it is assumed that memory channel 130 has 64 data bits and is configured to transfer 64 bits per data transfer operation—e.g., a read or a write operation. In FIG. 3(a), mode register 210 sets the bus width for the I/O interfaces of processing unit 110 and memory device 120 to full bus width. At full bus width, all 64 data bits of memory channel 130 are active during operation of computing environment 100, in which one data transfer operation on memory channel 130 is required to transfer 64 bits between processing unit 110 and memory device 120.

In FIG. 3(b), mode register 210 sets the bus width for the I/O interfaces of processing unit 110 and memory device 120 to half bus width. At half bus width, the upper 32 bits of memory channel 130 (shown in solid lines) can be active and the lower 32 bits of memory channel 130 (shown in dashed lines) can be inactive, or vice versa, during operation of computing environment 100. Here, two data transfer operations (also referred to herein as "data transfer cycles") on the active 32 bits of memory channel 130 (e.g., either the upper 32 bits or the lower 32 bits of memory channel 130) are required to transfer 64 bits between processing unit 110 and memory device 120. The upper half or lower half of memory channel 130 can be inactive due to one or more faults detected in either the upper or lower half of data bus, respectively.

In FIG. 3(c), mode register 210 sets the bus width for the I/O interfaces of processing unit 110 and memory device 120 to an "even/odd" bus width. The "even/odd" bus width corresponds to active even bits (e.g., bits 0, 2, 4, 6, etc. shown as solid lines) and inactive odd bits (e.g., bits 1, 3, 5, 7, etc. shown as dashed lines), or vice versa, during operation of computing environment 100. Here, two data transfer operations on the active 32 bits of memory channel 130 (e.g., either the even 32 bits or the odd 32 bits of memory channel 130) are required to transfer 64 bits between processing unit 110 and memory device 120. The even or odd bits of memory channel 130 can be inactive due to one or more faults detected in either the even or odd bits of the data bus, respectively.

In another embodiment, a combination of the bus width configurations described above with respect to FIGS. 3(a)-(c) can be implemented. For example, an upper half of memory channel 130 can be active (e.g., bus width configuration of FIG. 3(b)) and, within that upper half of memory channel 130, even bits can be active and odd bits can be inactive (e.g., bus width configuration of FIG. 3(c)). As a result, a quarter of memory channel 130 is used to transfer data between processing unit 110 and memory device 120 of FIG. 1. Four data transfer operations on the active quarter of bits of memory channel 130 are required to transfer 64 bits between processing unit 110 and memory device 120. The other bits of memory channel 130 can be inactive due to one or more faults detected in these bits.

In yet another embodiment, other configurations of data bus partitioning can be implemented. For example, memory channel 130 can be divided into quarter bus widths—e.g., bits 0-15 correspond to a first quarter, bits 16-31 correspond to a second quarter, bits 32-47 correspond to a third quarter, and bits 48-63 correspond to a fourth quarter of bits—in which one of the quarter bus widths is active during operation of computing environment 100. Here, four data transfer operations on the active quarter bus width of memory channel 130 are required to transfer 64 bits between processing unit 110 and memory device 120. The other bits of memory channel 130 can be inactive due to one or more faults detected in these bits.

A benefit, among others, of the above data bus partitioning embodiments is that, although one or more faults in memory channel 130 may occur, computing environment 100 of FIG. 1 is still operational. Although the system may have degraded performance due to a smaller memory channel, the system is not faulty (or "dead"). This allows data stored in memory device 120 to be read and backed-up on another system while the one or more faults can be repaired. Alternatively, if the one or more faults are detected during a device test phase of manufacturing, the data bus can be partitioned based on the above embodiments. In addition, computing environment 100 can be placed in a cheaper/lower-performance bin to be sold (as opposed to disposal of the entire electronics package for a loss). This is particularly beneficial for electronics packaging in which processing unit 110, memory device 120, and data bus $130_0$-$130_N$ of computing environment 100 are integrated in the same package (e.g., stacked integrated circuit package) because the electronics packaging is not faulty (or "dead") due to one or more faults in the memory channel connecting the processing unit to the memory device.

Based on the description herein, a person of ordinary skill in the art will recognize that it is not necessary to partition data bus $130_0$-$130_N$ of FIG. 1 based on one or more faults in the data bus. That is, it may be cost beneficial to manufacture the processing unit/memory device system of FIG. 1 and "de-feature" the system during a device test phase of manufacturing. For example, during the device test phase of manufacturing, computing environment 100 may not have faults in data bus $130_0$-$130_N$. However, the manufacturer may choose to "de-feature" the system by reducing the number of active bits in the data bus—e.g., reduce the data bus from full to half bus width—and sell the system at a lower or different price. In turn, the same manufacturing process can be used to manufacture the system, thus allowing the manufacturer to offer different options/configurations of the same system to customers.

Figure 4:
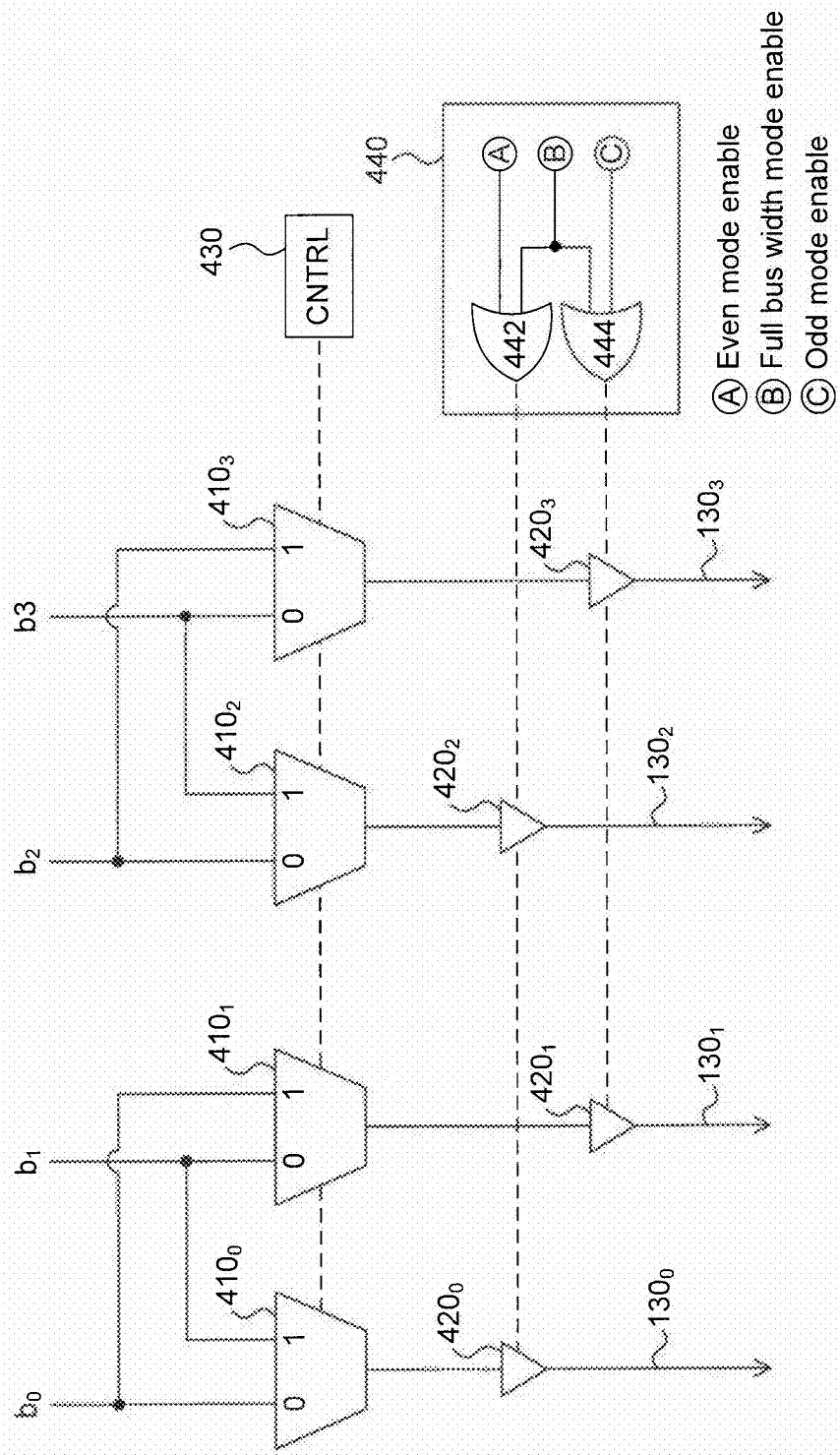
FIG. 4 is an illustration of an embodiment of a portion of a memory device input/output interface and column selection logic.

FIG. 4 is an illustration of an embodiment of a portion of a memory device I/O interface and column selection logic (collectively referred to herein as "memory device interface 400") for implementing one or more of the above data bus partitioning embodiments. As would be understood by a person of ordinary skill in the art, with regard to FIG. 1, memory device interface 400 can be integrated into memory device 120 and serve as an interface for data bus $130_0$-$130_N$ to facilitate the transfer of data between processing unit 110 and memory device 120. For ease of reference, memory device interface 400 illustrates 4 bits from data bus $130_0$-$130_N$—namely, bits $b_0$-$b_3$.

Memory device interface 400 includes a 2:1 multiplexer 410 and a buffer 420 for each of bits $b_0$-$b_3$. Memory device interface 400 also includes a multiplexer control device 430 and a buffer control device 440. Each multiplexer 410 includes a '0' input and a '1' input, in which multiplexer control device 430 selects one of the two inputs as the multiplexer's output. In an embodiment, buffer control device 440 includes two "OR" logic gates 442 and 444 with inputs A, B, and C. Input A represents an even mode enable signal, Input B represents a full bus width mode enable signal, and Input C represents an odd mode enable signal. Inputs A, B, and C activate one or more buffers $420_0$-$420_3$, as described in detail below.

In an embodiment, for a full bus width mode of operation (e.g., all bits in data bus $130_0$-$130_N$ are active), Input B is set to '1' and multiplexer control device 430 selects input '0' from each of multiplexers $410_0$-$410_3$. In turn, multiplexers $410_0$-$410_3$ output bits $b_0$-$b_3$, respectively. Logic gates 442 and 444 output a '1', thus activating buffers $420_0$-$420_3$ and passing bits $b_0$-$b_3$ to data bus $130_0$-$130_3$, respectively. As a result, the full data bus is activated.

In an embodiment, for an even mode of operation (e.g., even bits in data bus $130_0$-$130_N$ are active), Input A is set to '1' and Inputs B and C are set to '0'. This input configuration generates a '0' at the output of logic gate 444, thus deactivating odd buffers $420_1$ and $420_3$. This input configuration generates a '1' at the output of logic gate 442, thus activating even buffers $420_0$ and $420_2$. In the even mode of operation, the transfer of data is in two phases, in which two data transfer operations are required, according to an embodiment. In the first phase, while Input A is set to '1' and Inputs B and C are set to '0', multiplexer control device 430 selects input '0' from each of multiplexers $410_0$-$410_3$. Since even buffers $420_0$ and $420_2$ are active, bits $b_0$ and $b_2$ are outputted onto data bits $130_0$ and $130_2$, respectively. In the second phase, while Input A is set to '1' and Inputs B and C are set to '0', multiplexer control device 430 selects input '1' from each of multiplexers $410_0$-$410_3$. Here, bits $b_1$ and $b_3$ are outputted onto data bits $130_0$ and $130_2$, respectively.

The odd mode of operation (e.g., odd bits in data bus $130_0$-$130_N$ are active) is similar to the even mode of operation. Inputs A and B are set to '0' and Input C is set to '1'. This input configuration generates a '0' at the output of logic gate 442, thus deactivating even buffers $420_0$ and $420_2$. This input configuration generates a '1' at the output of logic gate 444, thus activating odd buffers $420_1$ and $420_3$. In the odd mode of operation, the transfer of data is in two phases, in which two data transfer operations are required, according to an embodiment. In the first phase, while Inputs A and B are set to '0' and Input C is set to '1', multiplexer control device 430 selects input '0' from each of multiplexers $410_0$-$410_3$. Since odd buffers $420_1$ and $420_3$ are active, bits $b_1$ and $b_3$ are outputted onto data bits $130_1$ and $130_3$, respectively. In the second phase, while Inputs A and B are set to '0' and Input C is set to '1', multiplexer control device 430 selects input '1' from each of multiplexers $410_0$-$410_3$. Here, bits $b_0$ and $b_2$ are outputted onto data bits $130_1$ and $130_3$, respectively.

Based on the description herein, a person of ordinary skill in the art will recognize that other configurations of multiplexers, buffers, and control logic can be used to implement not only the full bus width, even, and odd modes of operations discussed above but also the other data bus partitioning embodiments disclosed herein.

Figure 5A:
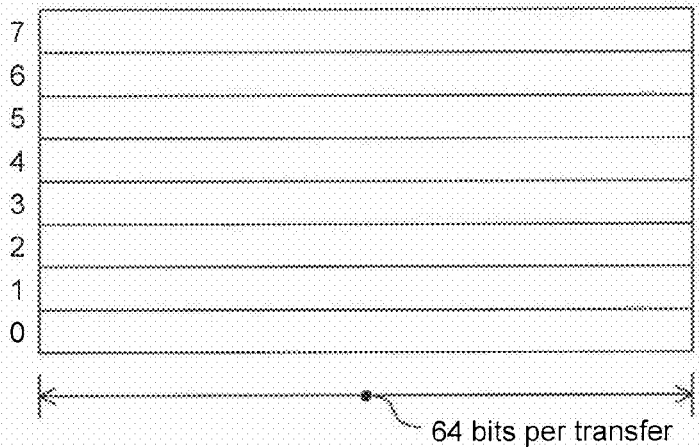
FIGS. 5(*a*) and 5(*b*) are illustrations of example data transfers between a processing unit and a memory device.

In another embodiment, with regard to FIG. 1, individual faulty bits from data bus $130_0$-$130_N$ can be deactivated. For explanation and example purposes, N=63 and a 64-byte value is transferred over data bus $130_0$-$130_{63}$, in which eight data transfers of 64 bits each are required. FIG. 5(a) is an illustration of this type of data transfer between processing unit 110 and memory device 120 via data bus $130_0$-$130_{63}$.

Figure 5B:
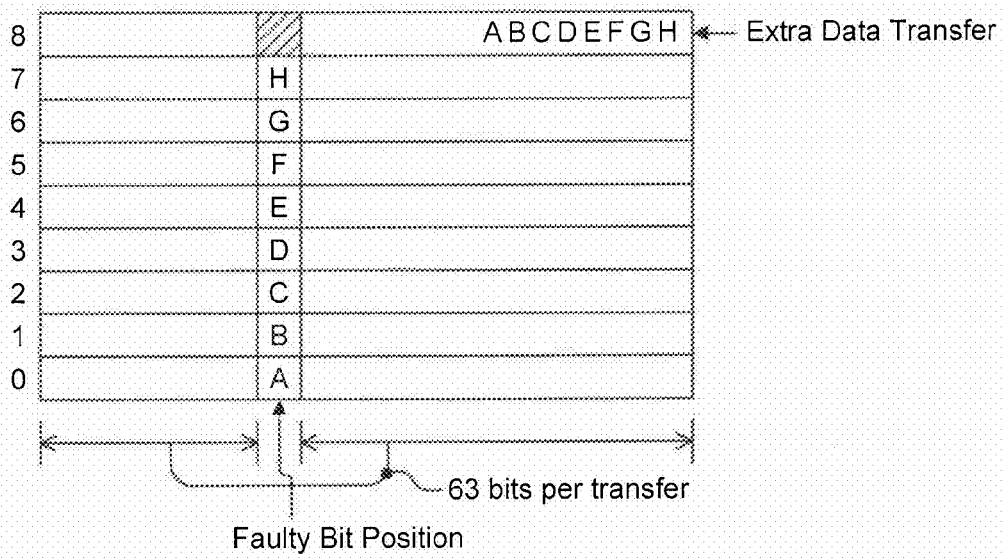

For further explanation and example purposes, it is assumed that bit $130_8$ has a fault and not used in the transfer of data between processing unit 110 and memory device 120. FIG. 5(b) is an illustration of this type of data transfer between processing unit 110 and memory device 120 via data bus $130_0$-$130_{63}$. In an embodiment, eight data transfers of 63 bits each are first performed. In reference to FIG. 5(b), bit $130_8$ represents the faulty bit position. Data 'A' represents bit $130_8$ for data transfer '0', data 'B' represents bit $130g$ for data transfer '1', data 'C' represents bit $130_8$ for data transfer '2', and so forth for data 'D'-'H' for data transfers '3'-'7', respectively. To account for the missing data from faulty bit $130_8$, a ninth data transfer is performed over data bus $130_0$-$130_{63}$. The ninth data transfer includes "missing" data 'A'-'H', according to an embodiment.

In an embodiment, a buffer circuit can be implemented in memory device 120 of FIG. 1 to store the "missing" data associated with faulty bit $130_8$ (e.g., data 'A'-'H' of FIG. 5(b)). The buffer circuit can provide the "missing" data to memory device interface 400 of FIG. 4 to transfer to processing unit 110 during a read operation. In another embodiment, the buffer circuit can also be implemented in processing unit 110, such that processing unit 110 can transfer the "missing" data to memory device 120 during a write operation. Other types of circuits/structures can be used to store the "missing" data, including but not limited to a shift register architecture and a multiplexer architecture.

In reference to computing environment 100 of FIG. 1, data is transmitted from processing unit 110 and received by memory device 120 during a write operation. Conversely, during a read operation, data is transmitted from memory device 120 and received by processing unit 110. As would be understood by a person of ordinary skill in the art, processing unit 110 and memory device 120 include transmit and receive circuits to perform the read and write operations along data bus $130_0$-$130_N$. A failure in data bus $130_0$-$130_N$ can be associated with these transmit and receive circuits, as would be understood by a person of ordinary skill in the art.

In an embodiment, partitioning of data bus $130_0$-$130_N$ can be based on a mode of operation of computing environment 100. In particular, partitioning of data bus $130_0$-$130_N$ can be based on one or more faulty bits associated with a failure in a write operation, a failure in a read operation, or a failure in both read and write operations. The following discussion provides examples of partitioning data bus $130_0$-$130_N$ based on one or more faulty bits associated with a failure in a write operation and a failure in a read operation. In an embodiment, for each of the examples below, mode registers 210 for processing unit 110 and memory device 120 are configured to partition data bus $130_0$-$130_N$ for the read and/or write operations.

For example, if a transmit circuit in processing unit 110 associated with a particular bit of data bus $130_0$-$130_N$ is faulty, then this particular bit cannot be used during a write operation (e.g., data transfer from processing unit 110 to memory device 120). However, if a receive circuit in processing unit 110 and a transmit circuit in memory device 120 for the particular bit are operational, then the particular bit can be used during a read operation (e.g., data transfer from memory device 120 to processing unit 110). Conversely, if a transmit circuit in memory device 120 associated with a particular bit of data bus $130_0$-$130_N$ is faulty, then this particular bit cannot be used during a read operation. However, if a receive circuit in memory device 120 and a transmit circuit in processing unit 110 for the particular bit are operational, then the particular bit can be used during a write operation. Based on the description herein, a person of ordinary skill in the art will recognize that the above examples are equally applicable to a faulty receive circuit in either processing unit 110 or memory device 120 and that the above examples are equally applicable to one or more bits in data bus $130_0$-$130_N$.

In an embodiment, if there are faults in one or more bits in data bus $130_0$-$130_N$ associated with a write operation, then additional data transfers (or additional data transfer cycles) over operational bits of data bus $130_0$-$130_N$ can be made to memory device 120. These additional data transfers can be, for example, similar to the data transfer example above with respect to FIG. 5(b). In this case, although there may be degradation in the write performance of computing environment 100, the read performance can remain unchanged. Conversely, if there are faults in one or bits in data bus $130_0$-$130_N$ associated with a read operation, then additional data transfers over operational bits of data bus $130_0$-$130_N$ can be made to processing unit 110. These additional data transfers can be, for example, similar to the data transfer example above with respect to FIG. 5(b). In this case, although there may be degradation in the read performance of computing environment 100, the write performance can remain unchanged.

In an embodiment, if one or more faulty bits are associated with failures in both read and write operations, the operational bits of data bus $130_0$-$130_N$ can be partitioned into a first pool of bits dedicated to read operations and a second pool of bits dedicated to write operations. The first and second pools of bits do not overlap according to an embodiment. In typical systems, as would be understood by a person of ordinary skill in the art, write operations have less latency than read operations. To leverage this latency difference between read and write operations, the operational bits of data bus $130_0$-$130_N$ can be partitioned asymmetrically, such that the number of operational bits allocated to read operations is greater than the number of operational bits allocated to write operations. For example, in a 64-bit data bus (e.g., data bus $130_0$-$130_{63}$) with one faulty bit, 43 of the operational bits can be allocated to read operations and 20 of the operational bits can be allocated to write operations. In an embodiment, with the partitioning of data bus $130_0$-$130_N$ into two non-overlapping pools of bits, the read and write operations can occur in parallel or concurrently in computing environment 100 of FIG. 1.

Figure 6:
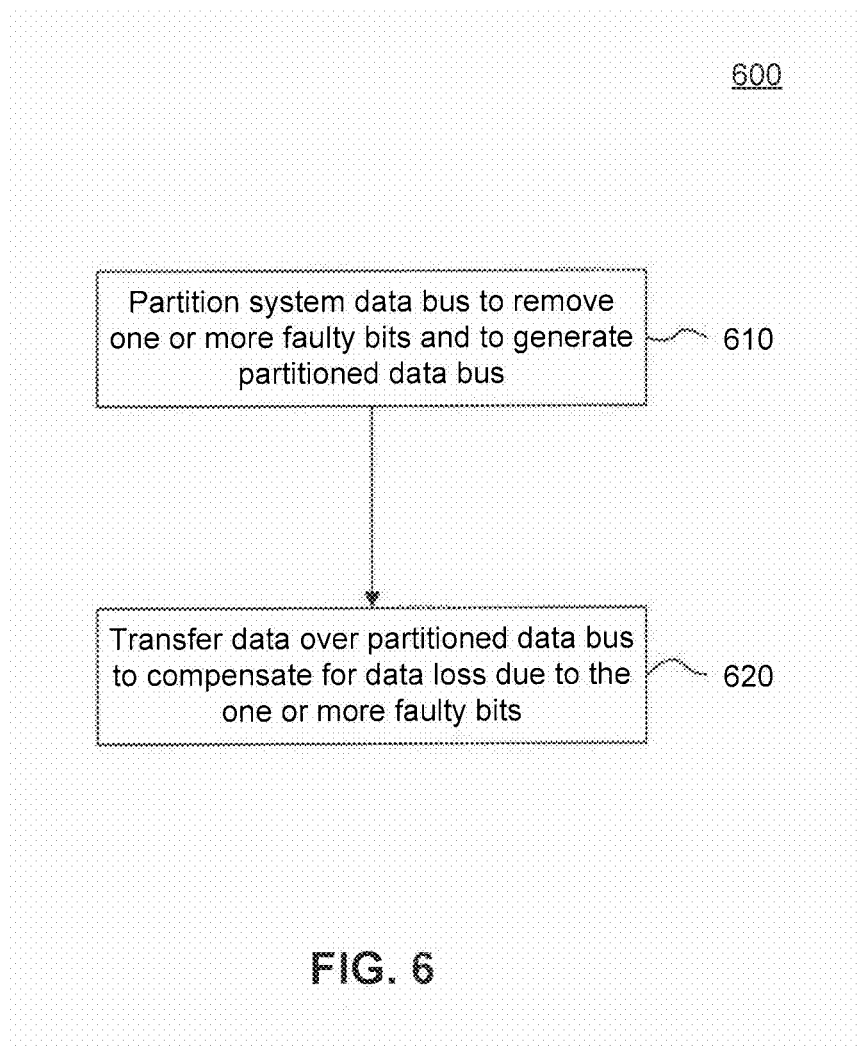
FIG. 6 is an illustration of an embodiment of a method for partitioning a data bus.

FIG. 6 is an illustration of an embodiment of a method 600 for partitioning a data bus. Method 600 can be implemented, for example, in computing environment 100 of FIG. 1. It is to be appreciated that method 600 may be performed in an order other than shown, and may not perform all operations shown.

In step 610, a system data bus is partitioned to remove one or more faulty bits in the system data bus and to generate a partitioned data bus. Step 610 can be performed by, for example, processing unit 110 of FIG. 1, in which one or more faulty bits can be removed from data bus $130_0$-$130_N$. Further, data bus $130_0$-$130_N$ can be partitioned in accordance with the embodiments disclosed herein.

In an embodiment, one or more buffers associated with the one or more faulty bits can be deactivated, in which the one or more buffers are located in an input/output interface of a memory device (e.g., memory device interface 400 of FIG. 4) and/or an input/output interface of a processing unit (e.g., processing unit 110 of FIG. 1). Further, in an embodiment, a mode register (e.g., mode register 210 of FIG. 2) can be configured to set active input/output interfaces of the processing unit and the memory device, in which the processing unit communicates with the memory device over the partitioned data bus. The mode register can be implemented in the processing unit, the memory device, or both the processing unit and memory device, according to an embodiment.

The system data bus can be partitioned into a half bus width data bus, a quarter bus width data bus, an even bit data bus, an odd bit data bus, a data bus only removing the one or more faulty bits, or a combination thereof, according to an embodiment. In an embodiment, the system data bus can be partitioned by deactivating the one or more faulty data bits during a read operation but not during a write operation. Alternatively, the system data bus can be partitioned by deactivating the one or more faulty data bits during the write operation but not during the read operation.

In another embodiment, non-faulty bits of the system data bus can be partitioned into a first pool of bits and a second pool of bits, where the first pool of bits are allocated to a read operation and the second pool of bits are allocated to a write operation. The first pool of bits and the second pool of bits can be non-overlapping, in which the read and write operations can occur concurrently or in parallel, according to an embodiment.

In step 620, data is transferred over the partitioned data bus to compensate for data loss due to the one or more faulty bits in the system data bus. Step 620 can be performed by, for example, processing unit 110 of FIG. 1.

In an embodiment, data can be transferred over the partitioned data bus multiple times to compensate for a single data transfer over the system data bus. The data associated with the one or more faulty bits can be stored in a buffer or other similar types of storage elements (as described in the above embodiments), where the stored data is transferred over the partitioned data bus after an initial data transfer over the partitioned data bus.

As discussed above, a benefit, among others, of the data bus partitioning embodiments disclosed herein is that, although one or more faults in a memory channel may occur, the processing unit/memory device system associated with the data bus is still operational. Although the system may have degraded performance due to a smaller memory channel, the system is not faulty (or "dead"). This allows data stored in the memory device to be read and backed-up on another system while the one or more faults can be repaired. Alternatively, if the one or more faults are detected during a device test phase of manufacturing, the data bus can be partitioned based on the above embodiments. In addition, the processing unit/memory device system can be placed in a cheaper/lower-performance bin to be sold (as opposed to disposal of the entire electronics package for a loss). This is particularly beneficial for electronics packaging in which the processing unit and the memory device are integrated in the same package (e.g., stacked integrated circuit package) because the electronics packaging is not faulty (or "dead") due to one or more faults in the memory channel connecting the processing unit to the memory device.

It is to be appreciated that the Detailed Description section, and not the Summary and Abstract sections, is intended to be used to interpret the claims. The Summary and Abstract sections may set forth one or more but not all exemplary embodiments as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by a person of ordinary skill in the art in light of the teachings and guidance. The breadth and scope of the present invention should not be limited by any of the above-described exemplary embodiments, but should be defined only in accordance with the following claims and their equivalents.

What is claimed is:

1. A method comprising:
  partitioning off a portion of a system data bus that includes one or more faulty bits to form a partitioned data bus, wherein the partitioning comprises at least one of the following:
    deactivating the one or more faulty data bits during a read operation, but not during a write operation;
    deactivating the one or more faulty data bits during a write operation, but not during a read operation; or
    partitioning the non-faulty bits of the system data bus into a first pool of bits and a second pool of bits, the first pool of bits allocated to a read operation and the second pool of bits allocated to a write operation; and transferring data over the partitioned data bus to compensate for data loss due to the one or more faulty bits in the system data bus.

2. The method of claim 1, wherein the partitioning comprises deactivating one or more buffers associated with the one or more faulty bits, the one or more buffers located in an input/output interface of a computing device.

3. The method of claim 1, wherein the partitioning comprises configuring a mode register to set active input/output interfaces of a first computing device and a second computing device, the first computing device communicating with the second computing device over the partitioned data bus.

4. The method of claim 1, wherein the partitioning comprises partitioning the system data bus into a half bus width data bus, a quarter bus width data bus, an even bit data bus, an odd bit data bus, a data bus only removing the one or more faulty bits, or a combination thereof.

5. The method of claim 1, wherein the partitioning the non-faulty bits of the system data bus comprises substantially concurrently performing the read operation using the first pool of bits and the write operation using the second pool of bits.

6. The method of claim 1, wherein the transferring comprises transferring the data over the partitioned data bus using additional data transfer cycles to compensate for data loss attributed to a single data transfer over the system data bus.

7. The method of claim 6, wherein the transferring the data over the partitioned data bus using additional data transfer cycles comprises storing data associated with the one or more faulty bits, the stored data to be transferred over the partitioned data bus after an initial data transfer over the partitioned data bus.

8. A system comprising:
a system data bus;
a first computing device; and
a second computing device in communication with the first computing device over the system data bus, wherein the system is configured to:
partition off a portion of the system data bus that includes one or more faulty bits to form a partitioned data bus; and
transfer data over the partitioned data bus to compensate for data loss due to the one or more faulty bits in the system data bus: and wherein the first and second computing devices are each configured to perform at least one of the following operations:
deactivate the one or more faulty data bits during a read operation, but not during a write operation;
deactivate the one or more faulty data bits during a write operation, but not during a read operation; or
partition the non-faulty bits of the system data bus into a first pool of bits and a second pool of bits, the first pool of bits allocated to a read operation and the second pool of bits allocated to a write operation.

9. The system of claim 8, wherein the system data bus, first computing device, and second computing device are integrated in the same electronics package.

10. The system of claim 8, wherein the first computing device is in a first electronics package and the second computing device is in a second electronics package, the system data bus providing off-chip communication between the first computing device and the second computing device.

11. The system of claim 8, wherein the first computing device comprises an input/output interface configured to deactivate one or more buffers associated with the one or more faulty bits.

12. The system of claim 8, wherein the first and second computing devices each comprise a mode register configured to set active input/output interfaces of the first and second computing devices, respectively.

13. The system of claim 8, wherein the first and second computing devices are each configured to partition the system data bus into a half bus width data bus, a quarter bus width data bus, an even bit data bus, an odd bit data bus, a data bus only removing the one or more faulty bits, or a combination thereof.

14. The system of claim 8, wherein the first and second computing devices are each configured to transfer the data over the partitioned data using additional data transfer cycles to compensate for data loss attributed to a single data transfer over the system data bus.

* * * * *